US005399831A

United States Patent [19]

McGee et al.

[11] Patent Number: 5,399,831

[45] Date of Patent: Mar. 21, 1995

[54] TERNARY GAS PLASMA WELDING TORCH

[75] Inventors: William F. McGee, Decatur; Daniel J. Rybicki, Huntsville, both of Ala.; Douglas J. Waldron, Palmdale, Calif.

[73] Assignee: The United States of America as represented by the Administrator, National Aeronautics and Space Administration, Washington, D.C.

[21] Appl. No.: 172,961

[22] Filed: Dec. 27, 1993

[51] Int. Cl.[6] .............................................. B23K 10/00

[52] U.S. Cl. ............................ 219/121.45; 219/121.5; 219/121.51; 219/121.48

[58] Field of Search ....................... 219/121.45, 121.48, 219/121.5, 121.51, 121.52, 75

[56] References Cited

U.S. PATENT DOCUMENTS 3,628,079 12/1971 Dobbs et al. .......................... 219/75

4,964,568 10/1990 Rotolico et al. ................. 219/76.16

4,990,739 2/1991 Zapatynsky ..................... 219/121.47

5,148,986 9/1992 Rusch ............................. 219/121.51

5,194,715 3/1993 Severance, Jr. et al. ....... 219/121.48

*Primary Examiner*—Mark H. Paschall

*Attorney, Agent, or Firm*—Robert L. Broad, Jr.; Guy M. Miller; Alan J. Kennedy

[57] ABSTRACT

A plasma arc welding torch wherein a first plasma gas is directed through the body of the welding torch and out of the body across the tip of a welding electrode disposed at the forward end of the body. A second plasma gas is disposed for flow through a longitudinal bore in the electrode. The second plasm gas enters one end of the electrode and exits the electrode at the tip thereof for coacting with the electric welding arc to produce the desired weld. A shield gas is directed through the torch body for circulating around the head of the torch adjacent the electrode tip.

4 Claims, 2 Drawing Sheets

TERNARY GAS PLASMA WELDING TORCH

ORIGIN OF THE INVENTION

This invention was made with government support under contract NAS8-36200 awarded by the National Aeronautics and Space Administration. The Government has certain rights in this invention.

FIELD OF THE INVENTION

This invention relates generally to plasma arc welding torches and more particularly to plasma arc welding torches having a hollow electrode including a tip through which an inert gas flows. The inert gas exits the electrode at the tip and coacts with an electric arc generated at the tip to form an arc plume which is directed onto the workpiece.

BACKGROUND OF THE INVENTION

Plasma arc welding is generally accomplished by placing a welding torch adjacent a workpiece and directing an inert gas across the tip of an electrode provided in the torch body and onto a workpiece. The interaction of the inert gas and hot electrode forms a substantially constricted arc between the tip of the electrode and the workpiece.

In a typical plasma arc welding torch, the electrode is comprised of a refractory material and is mounted in the torch body in thermally and electrically insulated relation therewith. The electrode is enclosed by the torch body and an inert gas is directed through channel or channels in the torch body and across the tip of the electrode and exits the body along with the electric arc, through an opening in the forward portion of the body.

The inert gas acts upon the electric arc present between the electrode and the workpiece to constrict its shape to that of a substantially narrow column. The inert gas also provides the necessary atmosphere which allows for electrical transfer of the arc across the gap formed between the electrode and the workpiece. In addition, this inert gas (defined herein as a primary orifice gas) provides some shielding effect to the molten weld zone as well as penetration control of the arc, depending on the volume of orifice gas flowing through the torch body. However, typically, a greater shielding effect is required and is accomplished by directing additional inert gas (defined herein as shield gas) around the outer surface of the orifice member and across the orifice thereof to provide a total inert atmosphere at the weld zone. This additional inert (shield) gas may be the same type of inert gas and received from the same source as the orifice inert gas, if desired. Or, the additional inert (shield) gas may be a different or same gas received from a second inert gas source, if desired.

The quality of the constricted plasma arc column (formed by interaction of the inert orifice gas and the electric arc) depends on the type of inert gas used as the (orifice) gas, the tip configuration of the electrode, the size, shape and condition of the constricting orifice and the volume of orifice gas directed from the torch body.

In the present invention, a secondary inert gas (defined herein as a secondary orifice gas) is directed through a hollow electrode to coact with the arc to produce equivalent defect free welds in types and thicknesses of metals (ferrous and non-ferrous) with less total heat input per inch of weld (i.e. less current/voltage output and/or high travel speeds). The completed weld is more narrow with greater penetration at any given electrical current setting, thereby producing a more desirable Heat Affected Zone (HAZ) and greater ultimate tensile strength values.

The jet of secondary orifice gas channeled through the tubular electrode compliments the primary inert gas column channeled through the torch body to provide a "stiffer" arc less subject to becoming skewed and unequal in dimensional shape. This characteristic will aid in alleviating weld "cutting" defects caused by an asymmetrical arc and subsequent asymmetrical heating pattern at the weld joint.

The secondary orifice gas channeled through the electrode could be any one of the inert gases or semi-reactive gases or a mixture of two or more depending on the material being welded and the results desired.

It is, therefore, an object of the present invention to provide an improved plasma arc welding torch.

It is a further object of the present invention to provide such a plasma arc welding torch which utilizes a secondary inert gas in conjunction with a primary inert gas to provide a substantially "stiffer" arc from the electrode of the torch than a typical single inert gas provides.

It is yet a further object of the present invention to provide such a plasma arc welding torch with an electrode having a longitudinal passage therein through which the secondary inert gas is directed.

DESCRIPTION OF THE PREFERRED EMBODIMENT

Figure 1:
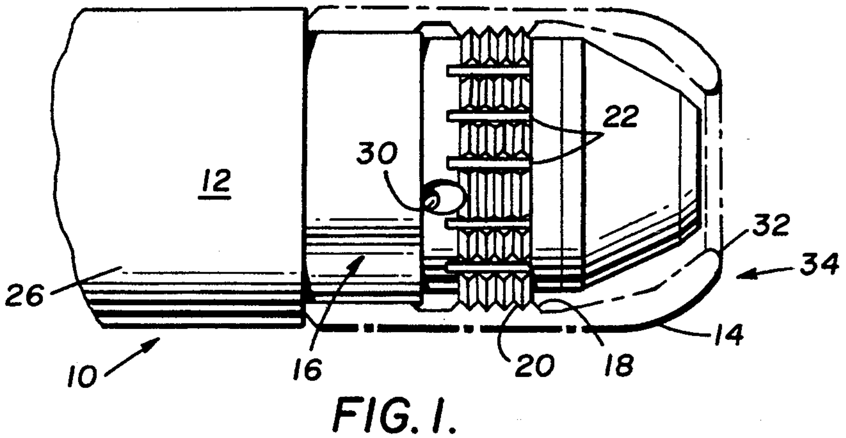
FIG. 1 is a side elevational view of the torch head of the present invention. The torch head is shown to be provided with external threads onto which a shielding gas cup is threadably secured. The shielding gas cup is shown in dot-dash lines so that the grooved external threading of the torch body may be better illustrated.
Figure 2:
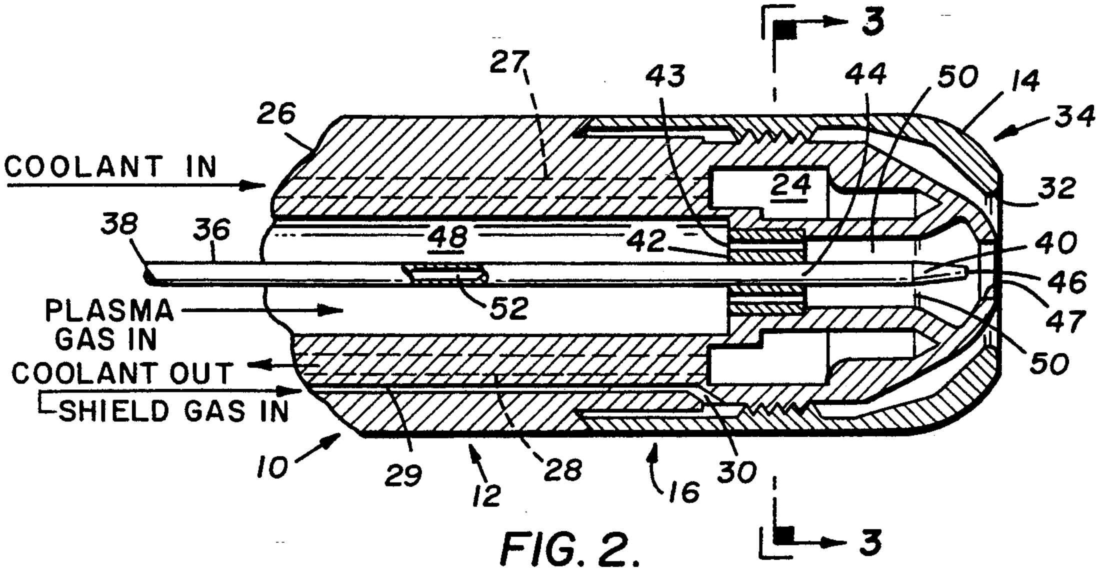
FIG. 2 is a partial longitudinal sectional view of the welding torch body of the present invention.
Figure 3:
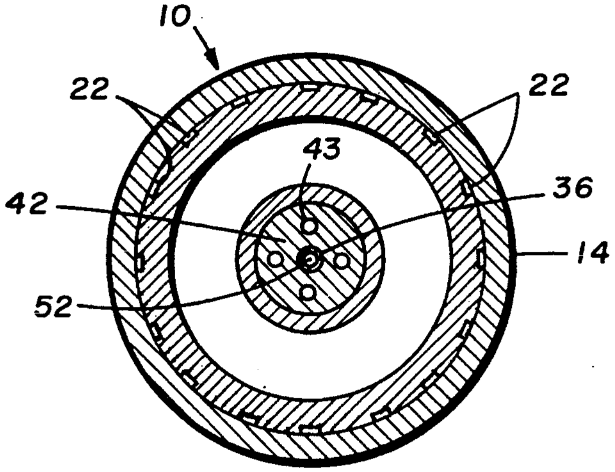
FIG. 3 is a sectional view taken along line 3—3 of FIG. 2.
Figure 4:
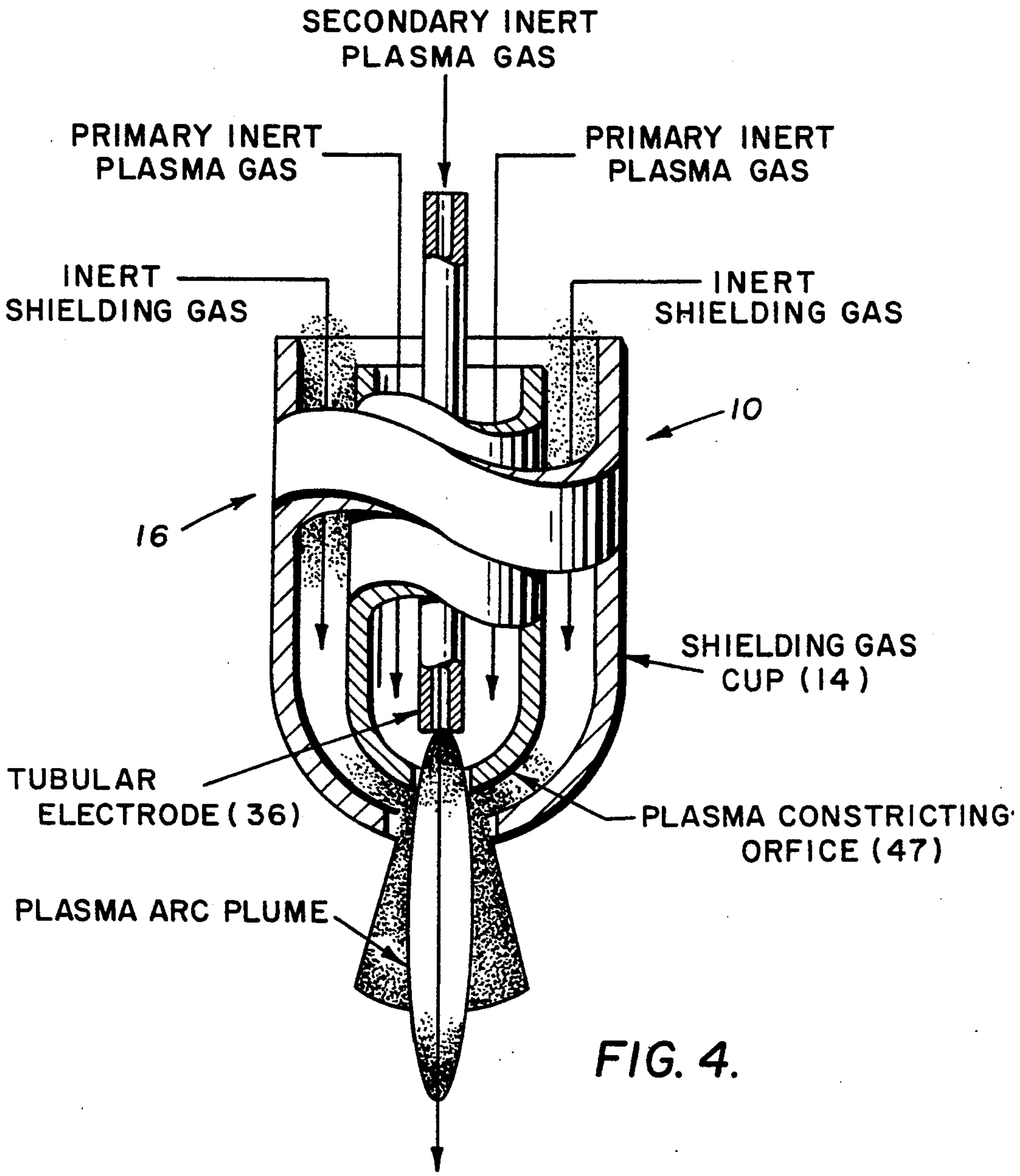
FIG. 4 is an elevational diagrammatic view of the forward portion of the torch body and illustrates the relative flow directions of the primary and secondary plasma gas as well as the flow direction of the shield gas.

As seen in FIGS. 1 and 2, a plasma arc welding torch 10 includes a body 12 having a shielding gas cup 14 disposed around the forward portion 16 thereof. Cup 14 includes internal threads 18 which threadably engage external threads 20 provided on the forward portion of the body. The external threads 20 are provided with grooves 22 (FIG. 1) transversely there across for reasons explained hereinbelow.

As seen in FIG. 2, the forward portion 16 of body 12 is provided with an annular cooling chamber 24 through which a coolant, such as water, is circulated. The water enters chamber 24 through a passage 27 provided in an aft portion 26 of body 12 and communicating with channel 24. The water exits the chamber 24 through a passage 28 provided in the aft portion 26 of the body and disposed in communications with channel 24. In like manner, a shield gas passage 29 is provided in the aft portion 26 of body 12 to direct a shield gas from a source (not shown) to the external surface of the forward portion 16 (head) of torch 10. The shield gas flows through the passage 29 and exits the torch body through an orifice 30 positioned adjacent to and on the aft side of threads 20. The shield gas is directed through grooves 22 (FIG. 1) in threads 20 for flow around the forward portion (head) of the torch. The shield gas is maintained in contact with the torch head by cup 14 as the gas is continuously flowed over the head and exits cup 14 through an opening 32 in the forward end 34 thereof.

As can be further seen in FIG. 2, an elongated hollow electrode 36 is mounted in the body 12 and includes one end 38 which is disposed for connection to a source of electrical power (not shown). The electrode 36 includes a second end 40 which terminates in the forward portion 16 of body 12. An annular thermally and electrically insulating support member 42 housing passages 43 therein supports electrode 36 in the forward portion of body 12.

To direct the flow of the primary inert orifice gas through the torch body, a passage 48 is provided in the aft portion of body 12 in communication with an annular chamber 50 in the forward portion of body 12 and a source primary inert gas. Primary inert orifice gas is directed through passage 48 of body 12, and the passages 43 of support member 42 and into chamber 50 for flow around forward portion 40 and tip 46 of electrode 36.

To direct the secondary inert orifice gas through body 12, electrode 36 is provided with a longitudinal passage 52 which is disposed in communication with a source of secondary orifice gas (not shown). The secondary orifice gas exits passages 52 at the tip of the electrode and exits body 12 through an orifice 47 in the forward portion of body 12.

It is understood that although a single inlet passage 48 is shown and described as used in directing the primary gas to the forward portion 40 of electrode through passages 43 of support member 42, other passage means may be resorted to, if desired. For example, the torch may be provided with a single or plurality of longitudinal passages in the body which communicates with the source or primary inert orifice gas and chamber 50 (other than through passage 43) whereby the primary inert orifice gas may be routed directly into chamber 50, thereby eliminating the need for passages 43 in support member 42.

It is to be understood that the secondary plasma gas referred to herein may be any of the inert gases or semi-reactive gases or a mixture of two or more gases of these gases. The choice of gases is dependent on the material being welded and the results desired. The process can be applied to Direct Current Straight Polarity and Variable Polarity Welding Modes.

It should be obvious from the foregoing that the principles of the present invention provides for a welding process that is much less operator dependent and expands the capabilities for joining thicker materials with relatively low inputs. The present invention also permits the formed sections of the workpiece to possess more desirable mechanical and physical properties. Also, the welding process afforded by the welding torch of the present invention is more economical and efficient than other welding processes because greater welding speeds are attainable and less weld defects occur due to a stiffer and more controllable arc.

It is to be further understood that although a specific construction has been discussed herein, it is for illustrative purposes only and various modifications of the appended claims will be readily apparent to those skilled in the art without departing from the spirit and scope of the claims.

We claim:

1. A plasma arc welding torch comprising:

a body having aft and forward end portions;

an electrode supported in said body, said electrode having an aft portion and a forward portion including a tip, said tip positioned in said forward portion of said body, and, said electrode disposed for producing an electric arc from said tip;

first passage means provided in said body and disposed for communication with a source of primary inert gas plasma producing gas for directing said primary inert plasma producing gas across said tip of said electrode;

second passage means being a longitudinal bore within said electrode, said longitudinal bore having a first end disposed for communication with a source of secondary inert plasma producing gas, and a second end for directing said secondary inert plasma producing gas out of said tip of said electrode for mixing with said electric arc and said primary inert plasma producing gas; and shielding gas means including third passage means disposed in communication with a source of shielding gas to direct said shielding gas around said forward portion of said torch body to provide an inert atmosphere at the weld zone adjacent said tip.

2. A plasma arc welding torch as set forth in claim 1 including a shield member positioned around said forward portion of said body for retention of said shielding gas means in contact with said forward portion of said body, and passage means provided in said body to direct said shielding gas means between the outer surface of said forward portion of said body and said shield member.

3. A plasma arc welding torch as in claim 2 including cooling means for providing a cooling effect to said forward portion of said body.

4. A plasma arc welding torch as set forth in claim 3 wherein said cooling means is defined by an inner annular cooling chamber in said forward portion of said body and passage means extending from said rear portion of said body to said cooling chamber, said passage means disposed for connection to said cooling source for directing coolant into and out of said cooling chamber.

* * * * *